Figure 1:
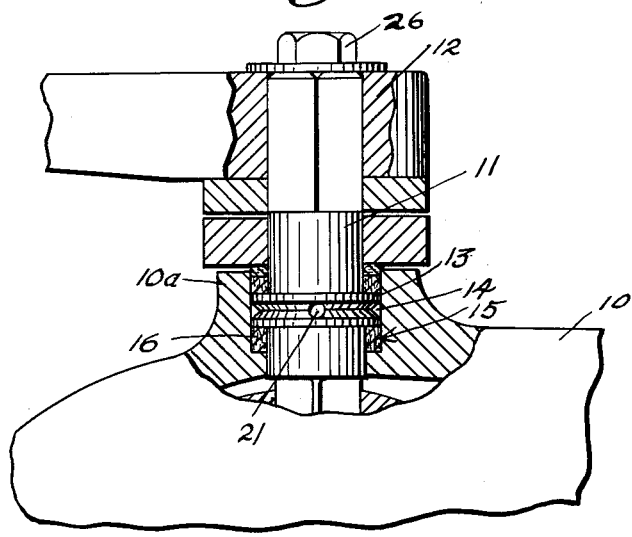

Sept. 4, 1962  H. G. FREEMAN  3,052,474
HYDRAULICALLY SEALED VALVE STEM
Filed May 19, 1959

Inventor:
Howard G. Freeman,
by Arthur D. Thomson
Attorney

United States Patent Office 3,052,474
Patented Sept. 4, 1962

3,052,474
HYDRAULICALLY SEALED VALVE STEM
Howard G. Freeman, Worcester, Mass., assignor to Jamesbury Corp., Worcester, Mass., a corporation of Massachusetts
Filed May 19, 1959, Ser. No. 814,231
1 Claim. (Cl. 277—70)

This invention relates to valves of the type controlled by a rotatable stem, and more particularly to means for sealing the stem to prevent leakage through the valve bonnet.

According to conventional practice an O-ring or other packing is placed around the stem, between the stem and valve bonnet, to seal the stem to the bonnet. The ring or packing must fit the stem tightly in order to create a fluid-tight joint, and the resulting friction makes the stem hard to turn. For extreme high pressure or high vacuum conditions it is difficult to make the seal tight enough. Furthermore, wear on the ring or packing eventually results in leakage and the bonnet must then be taken apart and repacked.

The general object of this invention is to provide a seal construction which is more effective than the conventional types, which does not make the stem unduly hard to turn, and which will remain fluid-tight for a long time under hard usage.

Figure 2:
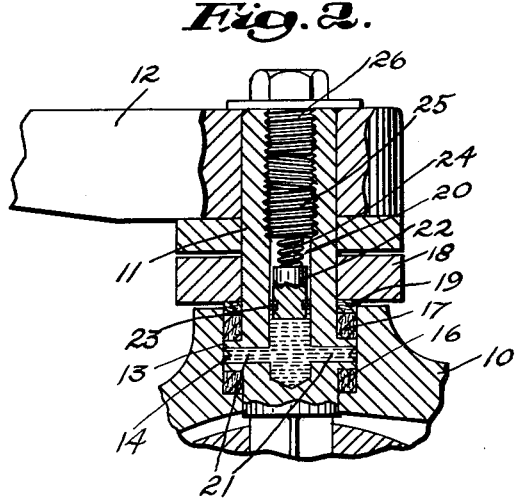

The seal is achieved by confining liquid under pressure between the stem and the bonnet. The stem has a circumferential groove which forms with the inner wall of the bonnet a chamber for the fluid. A bore in the stem communicates with the groove through ports. Part of the bore is filled with fluid and the fluid is placed under pressure by a spring-pressed plunger mounted in the bore. Other advantages and novel features of the seal construction will be apparent from the detailed description which follows:

In the drawings illustrating the invention:

FIG. 1 is a cross-section, taken along the axial direction of the stem, of a valve bonnet equipped with a seal constructed according to the invention, the stem being shown in elevation; and FIG. 2 is a cross-section in the same direction through the bonnet and stem.

The valve casing 10 has a tubular extension 10a forming a bonnet through which the stem 11 passes. The lower end of the stem is engaged with the ball or closure member of the valve in any usual manner and a handle 12 is mounted on the upper end. The stem has a flange 13 with a V-shaped circumferential groove 14. The flange is received in a counter bore 15 in extension 10a and seated on a packing ring 16 mounted in the bore, and another packing ring 17 is mounted above the flange. This assembly is secured to the body by a plate 18 bearing on a compression ring 19, and bolted or screwed to the body in any suitable way.

The stem has a bore 20 extending from the top down past the flange. Four ports 21 in the flange lead from bore 20 to groove 14. A plunger 22 is slidably mounted in the bore and sealed to the wall of the bore by an O-ring 23. A coil spring 24 bears on plunger 22 and is backed up by a set screw 25 threaded into the upper part of the bore. The upper end of the bore is closed by a cap screw 26 which also secures the handle. The bore 20 below the piston forms a chamber communicating with groove 14 through ports 21. The chamber and groove are filled with fluid, such as oil. Pressure is applied to the fluid by the spring-pressed plunger 22 and the pressure can be varied by adjusting the position of set screw 25.

The packing rings 16 and 17 serve in part as a stem seal and also to seal the chamber formed between groove 14 and the inner wall of the bonnet. As these rings wear they can be kept tight by tightening bonnet plate 18. The fluid is under higher than atmopheric pressure. Therefore, air will not tend to leak in from the outside when the valve is used in a high vacuum system. When the valve is used in a high pressure system, the pressure differential between the sealing fluid and the valve interior is less than it would be in a conventional construction where one side of the seal is exposed to atmospheric pressure. The tendency toward leakage past ring 16 is thus reduced, and the fluid in the groove adds to the sealing effect provided by the packing rings without increasing friction between the stem and bonnet.

What is claimed is:

A bonnet seal, for a valve having a rotatable stem with an outer end, comprising a bonnet having a recess with an interior wall surrounding and spaced from said stem, said stem having a flange engaging said wall and a circumferential groove in said flange forming with said wall an enclosed chamber, said flange having inner and outer faces, a pair of packing rings disposed in said recess, one against said inner face and the other against said outer face and engaging said wall, means for securing and compressing said rings, said stem having a bore opening at said outer end and a fluid passage connecting said bore and said groove, a plunger slidably mounted in said bore between said flange and said outer end, liquid material filling said groove and said bore to said plunger, and a spring mounted in said bore and pressing on said plunger, thereby applying pressure to said liquid.

References Cited in the file of this patent
UNITED STATES PATENTS

| | | |
|---|---|---|
| 354,936 | Rohn | Dec. 28, 1886 |
| 779,480 | Johnston | Jan. 10, 1905 |
| 1,078,953 | Prellwitz | Nov. 18, 1913 |
| 1,214,607 | Stephens | Feb. 6, 1917 |
| 2,187,733 | De Juhasz | Jan. 23, 1940 |
| 2,731,282 | McManus et al. | Jan. 17, 1956 |

FOREIGN PATENTS

| | | |
|---|---|---|
| 563,804 | Italy | June 5, 1957 |